Sept. 27, 1938.  E. S. PRINCE  2,131,190
LIQUID MIXING APPARATUS
Filed July 27, 1937
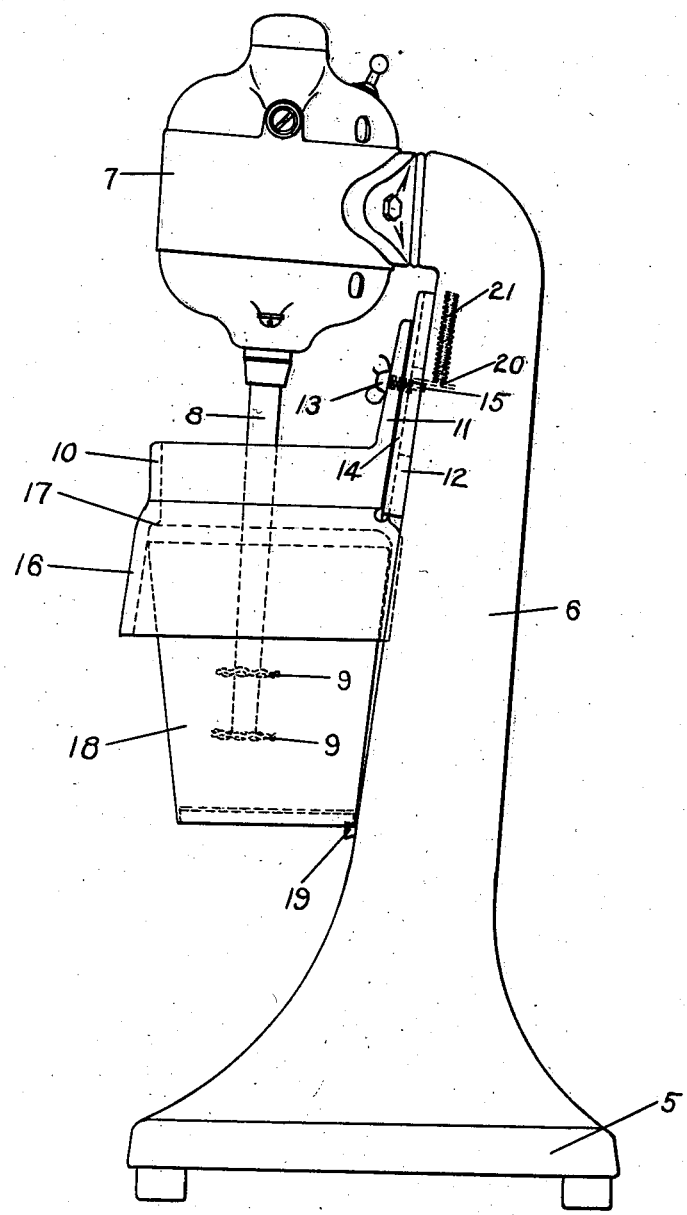
Inventor
Earl S. Prince,
Walter N. Haskell.
By  his Attorney Patented Sept. 27, 1938

2,131,190

UNITED STATES PATENT OFFICE 2,131,190

LIQUID MIXING APPARATUS

Earl S. Prince, Sterling, Ill.

Application July 27, 1937, Serial No. 155,933

2 Claims. (Cl. 259—122)

My invention has reference to a drink mixing apparatus, and it relates more specially to a device for thoroughly combining the ingredients of a malted milk concoction and similar beverages. Its chief purpose is to increase the efficiency and flexibility of operation of such machines.

It is customary at the present time to mix a quantity of drink in a container of relatively large size by means of an electrically driven agitating device. Following the mixing operation the contents of the container are poured into another receptacle for serving. In this operation a portion of the mixture adheres to the walls of the container, with a consequent waste thereof. The use of the large containers is necessitated on account of the whipping action of the mixing device, which results in an overflow of the contents in a container of suitable size for serving the drink after it is mixed, and to catch the portion of the drink adhering to the mixing device, which is thrown outwardly by the centrifugal action of the agitator, which is automatically self-cleaning.

The present invention simplifies the operation of mixing the drinks, makes it possible to mix and serve the drink in the same receptacle, and eliminates the loss occasioned by pouring from one receptacle into another.

The invention consists primarily of a metal ring provided with a slightly flaring skirt portion, into which the upper part of a receptacle, such as a mixing cup, can be inserted, such ring forming an extension for the cup, and making it possible to use a smaller cup or glass. This extension also provides a shield for the upper part of the cup, preventing the contents thereof from overflowing or splashing outwardly from the container. A close frictional connection is formed between the cup and the shield during the mixing operation. The flaring skirt also forms a shield which catches that part of the drink adhering to the dasher, and which is thrown off by centrifugal force.

Another feature of the invention consists in making use of the extension or ring member to close an electric circuit and start the operation of the machine. This is caused by reason of the extension being forced upwardly by the cup in positioning the same therein, means also being provided for holding the cup and ring in elevated position while the mixing is being done. This is accomplished by the engagement of the extension, or a connection thereof, with a yieldable switch member, which also assists in holding the parts in locked position. The arrangement is such that the motor is started at a critical time, with the apparatus and its contents ready for the mixing operation. Similarly, the power is shut off at a critical moment, with the initial operation of removing the mixing cup and its contents from the machine.

The extension part of the container is sufficiently weighted to cause the same to move downwardly by force of gravity, and follow the cup downwardly as it is being removed. The upper part of the cup is also kept clean at all times by the enclosing shield, and the ring or shield can be readily removed for cleaning the parts.

The above named, and other features and advantages of the invention will more fully appear from the following specification, reference being had to the accompanying drawing, showing a single figure, which is a side elevation of a machine embodying the invention.

The main part of the machine is of standard construction, and includes a base 5, a hollow standard 6, and an electric motor 7, supported at the upper part of the standard. The motor shaft 8 carries the usual dashers or agitators 9, for operation in a container supported in the machine.

Supported from the inner face of the standard 6 is a circular member or ring 10, by means of a plate 11 connected with said ring, and slidable vertically on a plate 12 fixed to the standard. The plate 11 is provided with a thumb-screw 13 having a threaded engagement therewith, and movable in a slot 14 in the plate 12.

Projected downwardly from the ring 10 is a skirt portion 16, provided with a shoulder 17 at the point of junction with said ring. The skirt 16 also flares downwardly and outwardly, so as to form a close frictional contact with containers of differing diameters. If desired, a gasket of rubber or other material can be inserted against the shoulder 17, to prevent any leak between the ring and a cup connected therewith.

A cup 18 is shown positioned in the extension, and held in place by a catch 19 fixed to the standard 6. In positioning the cup 18 in the holder it moves such holder or extension upwardly, bringing the end 15 of the screw 13 into contact with a switch-pin 20, moving said pin sufficiently to close a switch in the standard 6, and cause the operation of the motor 7. The movement of the switch-pin is against the force of a coiled spring indicated at 21, which spring tends to return the pin 20 downwardly when released, and also assists in holding the cup and holder in close engagement, and with the lower edge of the cup forced against the catch 19.

Following the mixing operation, the lower edge of the cup is released, and the cup moved downwardly, with the part 10 engaged therewith, until it is finally disconnected, with the drink ready to be served in the cup 18. In the downward movement of the cup and holder the dasher continues to rotate for a sufficient length of time to discharge any of the ingredients that may be still clinging thereto. During the operation there is little tendency of the contents of the cup working upwardly above the same, but if it does it is prevented from escaping by the shield 10, and settles down into the cup as soon as the movement of the motor is interrupted.

It will be noted that the parts 10 and 16 form what amounts to an extension of the cup 18, and that by this means it is possible to mix and serve drinks in cups of common size, instead of having to mix them first in a large container, such as are in common use. It will also be noted that as soon as the ingredients are in place in the cup, and the cup in place in the machine, the mixing operation proceeds, and is instantly interrupted on the removal of the cup and downward movement of the holder.

Cups of the usual pasteboard construction can be employed, but they may be formed of more permanent material, and those of common glass construction can be used.

There has been shown and described herein the preferred form of the invention, it being understood that changes can be made therein, and in the manner of operating the same, without departing from the spirit of the invention, as claimed herein.

What I claim, and desire to secure, is:

1. The combination of a standard, an electric motor mounted on said standard, provided with a spring-controlled switch, a mixing device connected with said motor for operation thereby, a plate slidable on said standard and engageable with said switch upon the movement of said plate, a circular member connected with said plate, and forming a mixing container extension, a drink mixing container in engagement with said extension, and means for supporting said container with said parts connected, and with said spring exerting pressure holding said container in place.

2. In a machine of the class described, a standard, a motor supported thereby and provided with a starting switch, a mixing tool carried by said motor, a container adapted to be supported by said standard, and a shell supported for vertical movement in said machine forming an extension of said container and frictionally engaged therewith, and movable by the contact of the container therewith to operate said starting switch.

EARL S. PRINCE.